(12) United States Patent
Johansson (10) Patent No.: US 6,240,623 B1
(45) Date of Patent: *Jun. 5, 2001

(54) SYSTEM AND METHOD FOR MANUFACTURING AN ELECTRIC HEATER

(75) Inventor: Göran Johansson, Charlottenberg (SE)

(73) Assignee: Tocksfors Verkstads AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,872

(22) PCT Filed: Dec. 18, 1996

(86) PCT No.: PCT/SE96/01692

§ 371 Date: Aug. 20, 1998

§ 102(e) Date: Aug. 20, 1998

(87) PCT Pub. No.: WO97/26775

PCT Pub. Date: Jul. 24, 1997

(30) Foreign Application Priority Data

Jan. 17, 1996 (SE) .................................................... 9600202

(51) Int. Cl.[7] .................................................. H05B 3/00
(52) U.S. Cl. ............................. 29/611; 29/612; 29/610.1; 228/4; 228/5
(58) Field of Search .................................. 29/611, 610.1; 140/102, 103, 109, 112; 219/528, 529, 548, 549, 217, 200, 202, 229, 536; 228/46

(56) References Cited

U.S. PATENT DOCUMENTS

| | | | |
|---|---|---|---|
| 1,961,991 | * 6/1934 | Southwell | 140/112 |
| 2,318,109 | * 5/1943 | Schultz | 219/46 |
| 2,698,893 | * 1/1955 | Ballard | 219/20 |
| 3,013,141 | * 12/1961 | Ellis | 219/46 |
| 3,017,493 | * 1/1962 | Cooke | 219/46 |
| 3,062,946 | * 11/1962 | Barber, Jr. | 219/46 |
| 3,349,359 | * 10/1967 | Morey | 338/208 |
| 3,722,777 | 3/1973 | Ziemek et al. . | |
| 4,162,393 | * 7/1979 | Balboni | 219/217 |
| 4,628,188 | * 12/1986 | Andreasson | 219/528 |
| 5,023,433 | * 6/1991 | Gordon | 219/548 |
| 5,068,518 | * 11/1991 | Yasuda | 219/549 |
| 5,824,996 | * 10/1998 | Kochman et al. | 219/529 |

FOREIGN PATENT DOCUMENTS

| 2537579 | 4/1976 | (DE) . |
|---|---|---|
| 0151501 | 8/1985 | (EP) . |

* cited by examiner

*Primary Examiner*—Lee Young
*Assistant Examiner*—Sean Smith
(74) *Attorney, Agent, or Firm*—Orum & Roth (57) ABSTRACT

The invention relates to a method and a system of manufacturing an electric heater (1) intended for heating foam-molded cushions for e.g. vehicle seats or mattresses, said heater (1) comprising an electric conductor (2) which preferably consists of an insulated or non-insulated metal wire. The method comprises the steps of arranging a plurality of protruding members (10) forming part of a conductor layout structure (9) in a pattern adapted to the configuration of the heater (1), arranging a conveyor (13) which is equipped with a follower (14) along a track (13) which essentially corresponds to the desired configuration of the heater (1) around said protruding member (10), and moving said conveyor (13) while said follower (14) deposits said conductor (2) along said track.

4 Claims, 10 Drawing Sheets

SYSTEM AND METHOD FOR MANUFACTURING AN ELECTRIC HEATER

The present invention relates to a system and a method for manufacturing an electric heater, preferably of the kind described in the Swedish patent application No. 9402508-7 which is included herein by way of reference A heater of this type is primarily intended for heating foam-molded cushions for e.g. vehicle seats or mattresses. The heater comprises an electrical conductor which preferably consists of an insulated or non-insulated metal wire for electrically heating the foam-molded cushion.

One object of the present invention is to make it possible to manufacture a heater of the kind outlined above in a simple and rapid manner.

This object is obtained by means of a system and a method for manufacturing an electric heater presenting the characteristics defined in the appended claims.

Currently preferred embodiments of the present invention will be described in the following in closer detail with reference to the accompanying drawings, wherein like numeral references have been used in the different drawing figures to denote functionally equivalent parts.

Figure 1:
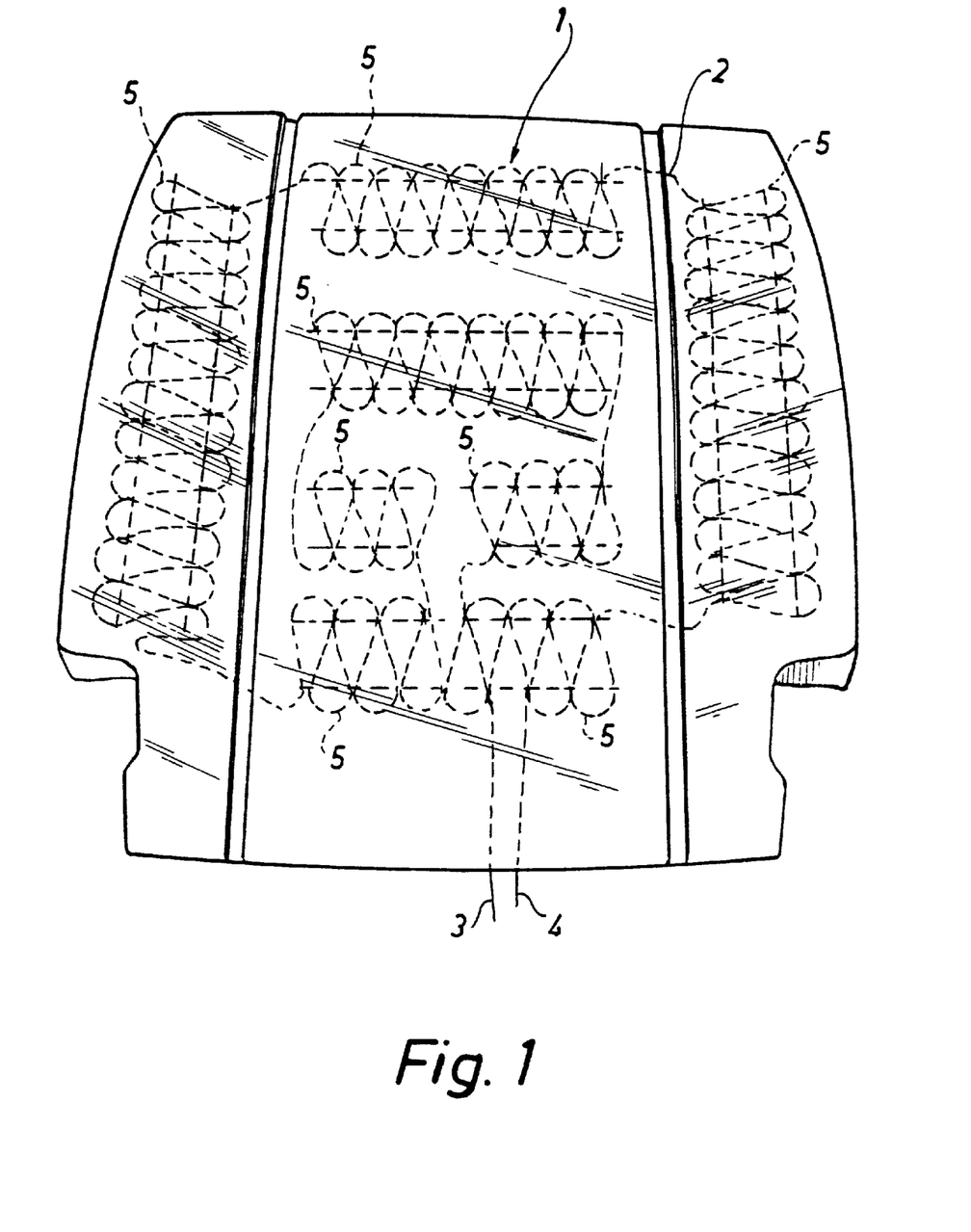
FIG. 1 illustrates schematically one example of a foam-molded cushion including a heater manufactured in accordance with the inventive method and/or while using the inventive system.

FIG. 1 is a perspective view of a seat cushion in which a heater, generally designated by 1, is for instance mainly embedded by molding. The heater 1 comprises at least one electrical conductor 2 the ends 3, 4 of which are electrically connected by means of contacts (not shown) to a source of electricity (not shown). The heating effect is produced by electric current being conducted through an electrical conductor 2 having suitable resistivity. As is easily understood it is possible to embed heaters 1, in the molding operation proper, also in other types of components, such as the backrest of a vehicle seat, armrests or in a mattress. As is likewise easily understood it is possible to embed the heater 1 in a part component of a cushion or the like, or to dispose for instance an essential part of the heater 1 intermediate part components, cushions or the like which components are later interconnected for instance by gluing or fusion, a method which provides essentially the same technical effect as by cast-in embedment of the heater 1. For more information regarding the technical advantages gained by arranging the heater 1 in a cushion or mattress in the manner indicated reference is made to the above-mentioned Swedish application No. 9402508-7.

Figure 13:
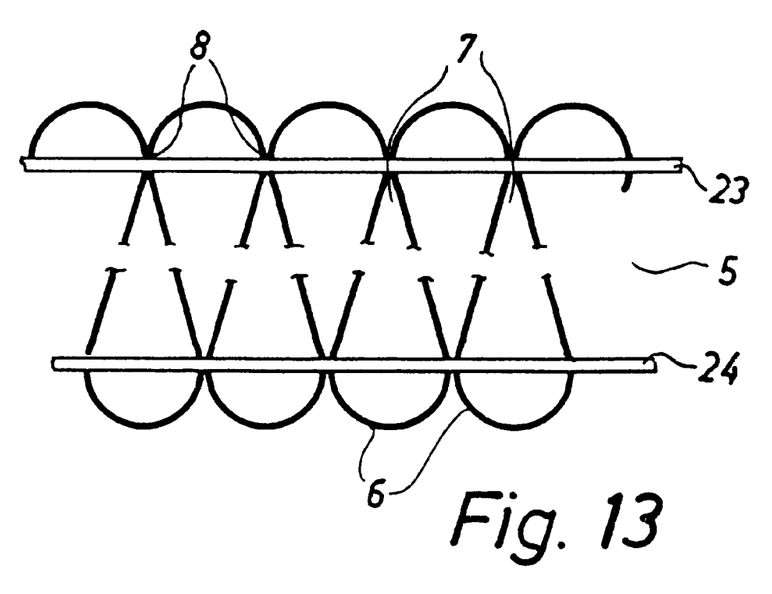
FIG. 13 illustrates an example of a band formed by a conductor and consisting of a plurality of loops that are interconnected by local interconnections.

FIGS. 1 and 13 show one example of a configuration of the lay-out of the heater 1 which heater in accordance with these examples has received its configuration as a result of the conductor 2 having been arranged in one or several bands 5 of closely juxtaposed bights, each one of which comprises a loop 6 and an open portion 7 facing away from said loop. In accordance with the shown embodiments adjacent loops 6 that are turned in the same direction essentially are in contact with one another at points of contact 8. However, it is easily understood that several modifications of the lay-out of the conductor 2 are possible, and examples of other modifications are shown for instance in the above-mentioned Swedish application No. 9402508-7,wherein the advantage of arranging the conductor in bights is also described.

At least parts of the heater 1 and preferably essentially all said open portions 7 or essentially all said points of contact 8 are locally interconnected in accordance with a preferred embodiment in order to form one or several connected bands 5 and consequently an essentially contiguous heater 1. The technical advantages gained by connected bands 5 and consequently by an essentially contiguous heater 1 appear from the above-mentioned Swedish patent application No. 9402508-7.The interconnection may be achieved for instance by means of gluing, welding, sewing or taping. FIG. 13 shows one example of establishing the interconnection with the aid of strips 23 and 24, for instance glue strands or strips of tape.

Figure 2:
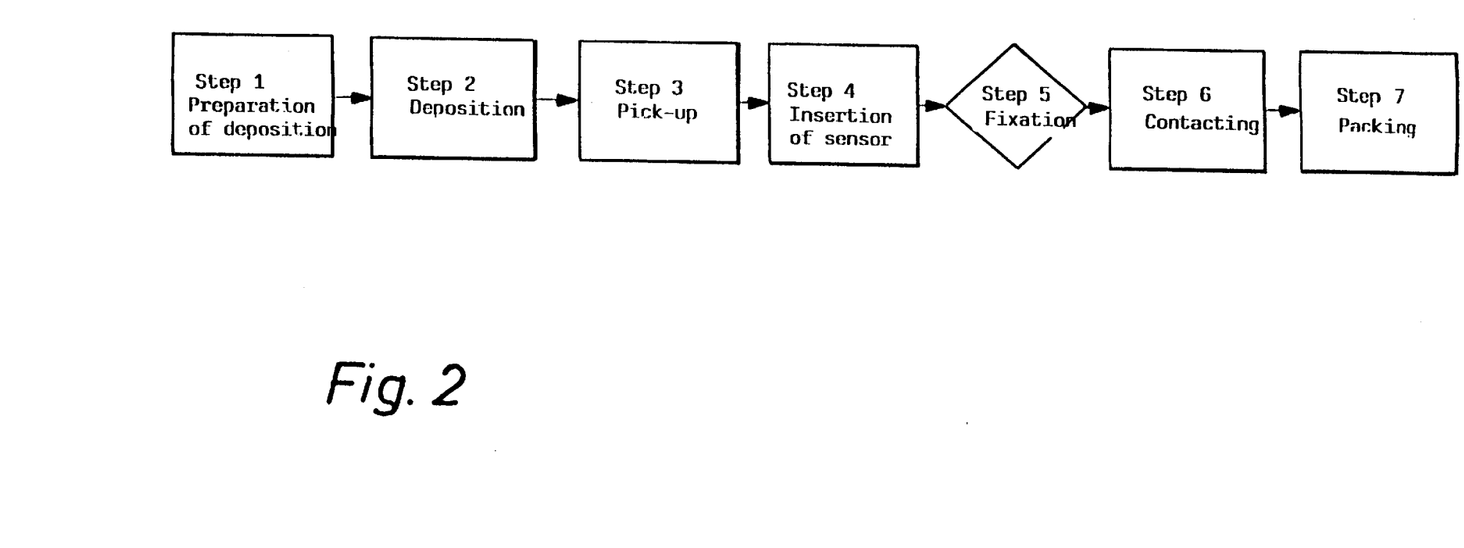
FIG. 2 illustrates schematically one example of the various steps of the inventive method for the manufacture of the heating device.

FIG. 2 illustrates the different principal steps for the manufacture of a heater in accordance with one embodiment of the inventive method. In accordance with this embodiment the deposition of a conductor 2 is prepared in step 1 by arranging a plurality of protruding members forming part of a conductor lay-out structure in a pattern that is adapted to the configuration of the heater 1, and by positioning a conveyor which is equipped with a follower member in the pattern of a path essentially agreeing with the desired configuration of the heater 1 around said protruding members. The conductor 2 is also interconnected with the follower means. In step 2, the conveyor is set in motion whereby the follower means will deposit the conductor 2 in said pattern, the protruding members forming part of a first fixture for the heater 1. The steps included in the method of FIG. 2 and the steps of other inventive methods will be described in the following with reference to the other appended drawing Figures.

Figure 3:
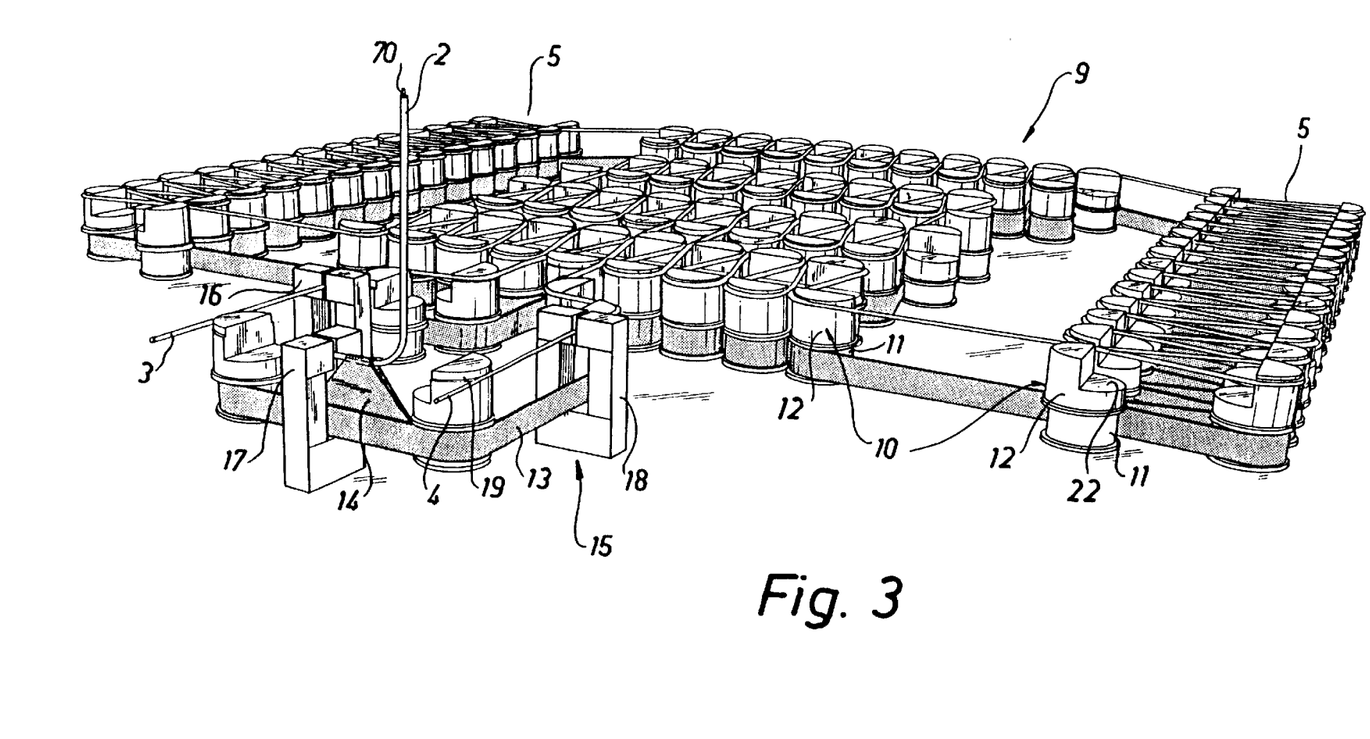
FIG. 3 illustrates schematically one example of an inventive conductor lay-out structure for a heater in accordance with a first embodiment.

FIG. 3 illustrates one example the conductor lay-out structure generally designated by 9 comprising a system for the manufacture of a heater 1. The conductor lay-out structure 9 comprises a plurality of protruding members generally designated by 10. Each protruding member 10, in accordance with the embodiment shown, has a lower part surrounded by a bearing 11, and an upper part 12. The upper part 12 preferably comprises a bevelled face 19 extending along the peripheral face at the upper end as seen in FIG. 3.

A conveyor 13, which in accordance with the embodiment illustrated is a belt conveyor, is arranged between the lower bearing part of the protruding members 10 so as to extend along a path essentially corresponding to the pattern of the heater 1 to be manufactured. The conveyor 13 is formed with a follower means 14 supporting a conductor 2. The end 70 of the conductor 2 preferably is connected to a conductor supply reel or the like (not illustrated) for essentially continuous supply of the conductor 2 to be deposited in the conductor lay-out structure 9. Preferably, the conveyor 13 extends continuously along said protruding members 10 and is connected to a device (not shown) which could be e.g. motor operated, to actuate the conveyor 13 for movement thereof. At one part of the conductor lay-out structure 9 a holder arrangement, generally designated by 15, is provided. In accordance with FIG. 3 the holder arrangement 15 comprises three holding devices 16, 17 and 18, each one of which is actuated by e.g. pneumatic means (not shown), for independent, individual movement between a locking position in which they each one holds fast a conductor 2 deposited beyond or through the holding device 16, 17, 18, and a release position, in which the conductor 2 is not so held fast. In accordance with a preferred embodiment the holding device 17 also includes a severing means (not shown) to cut off or otherwise produce an interruption in the conductor 2.

Figure 4:
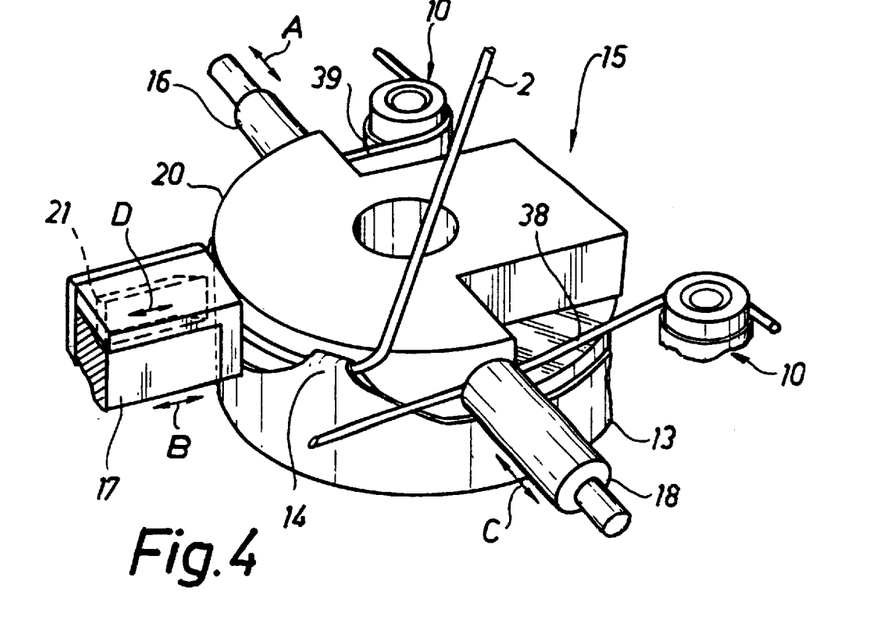
FIG. 4 illustrates schematically one example of an alternative embodiment a holder arrangement included in a conductor lay-out structure.

FIG. 4 illustrates a holder arrangement 15 in accordance with a second preferred embodiment. The holding devices 16, 17 and 18 are movable in the direction indicated by arrows A, B and C, respectively, between said locking and release positions. In this case dashed lines indicate a severing means 21 which is movable in the direction indicated by arrow D, between the illustrated position and a position wherein said device produces a disconnection in the conductor 2. The e.g. semi-circular body 20, about which the conveyor 13 including its following means 14 is arranged, preferably is formed with a bevelled face or a back-up face in the area of severence to facilitate the cutting-off of the conductor 2.

The conductor lay-out structure 9 functions in the following manner. In accordance with the examples illustrated in FIGS. 3 and 4, the direction of movement of the conveyor 13 is counter-clockwise. In the starting position (not shown) the conductor 2 is held fixedly by the holding device 17, the conveyor 13 is at a stand-still, and the follower means assumes a position between the holding device 17 and the holding device 18. The holding devices 16 and 18 assume their release position. The conveyor 13 is set in motion, and the follower means 14 deposits the conductor 2 about the upper part 12 of the protruding members 10, above the bevelled face 19 thereon. The bevelled face 19 on the protruding members 10 prevents the conductor 2 from sliding downwards alongside the protruding members 10 as seen in FIG. 3. When the follower means 14 moves past the holding device 18 the latter is shifted to its locking position, whereupon the holding device 17 is shifted to its release position. The conductor 2 is then released from the holding device 17, for instance through the inherent resilience of the conductor 2 or with the aid of a means (not shown) for release thereof. One end 2 of the conductor 2 and thus of the heater 1 is held fast by the holding device 18 in a first point in the area of one end 4 of the conductor 2 during the laying-out or deposition operation.

The follower means 14 is moved past and around the rest of the protruding members 10, which members are disposed in a pattern matching the configuration of the heater 1, during which movement the follower means 14 deposits the conductor 2 along the path formed by the conveyor 13, which path essentially corresponds to the desired configuration of the heater 1 (see for example FIGS. 1 or 13).

When the follower means 14 passes the holding device 16 the latter is shifted to its locking position, holding the conductor 2 fixedly in a second point in the area of the second end 3 of the conductor 2 and thus of the conductor lay-out structure 1.

The follower means 14 is then moved past the holding device 17, the latter then being shifted to the locking position. The conveyor 13, and thus the follower means 14, are stopped, bringing the follower means 14 to a stand-still between the holding devices 17 and 18 as illustrated in FIG. 4. The conductor 2 then is severed with the aid of a suitable means, such as a cutting device 21. In this position, a conductor 2 is laid out in the conductor lay-out structure 9 in the desired path configuration around protruding members 10, and the conductor 2 is held fixedly in the area of its ends 3, 4 by the holding devices 16 and 18, respectively. In a cut-off operation this conductor 2 has been severed from the conductor 2 one end of which is held fast in the holding device 17 and engaging with the follower means 14 and the opposite end of which 70 is arranged for instance about said conductor supply reel, which position is illustrated in FIG. 3. The conductor lay-out structure 9 thus forms a first fixture for the conductor 2 deposited in the conductor lay-out structure 9. In accordance with the shown example the conductor 2 has been positioned along a path in the conductor lay-out structure 9 comprising several bands 5 of closely juxtaposed bights. The pattern of the laid-out conductor 2 in FIG. 1 does not exactly agree with the pattern of the conductor 2 in FIG. 3. The pattern of the laid-out conductor 2 may be varied to suit various purposes, for instance by altering the path of the conveyor 13, by shifting the positions of the protruding members 10 or by exchanging one component, such as a plate to which several or all protruding members 10 are secured, and the lay-out pattern of the conductor as shown in FIGS. 1 and 3 are merely intended to show various example of path patterns.

It is easily understood that the conductor 2, the follower means 14, the conveyor 13, the holder arrangement 15 and the protruding members 10 may be configured differently from that or those shown.

In accordance with the illustrated preferred embodiment the follower means 14 does not pull the conductor 2 behind, because the friction that would arise between the conductor 2 and the protruding members 10, should such an arrangement be adapted, would cause problems in the conductor laying-out operation. Instead, the conductor 2 is supplied from a reel holding conductor material, to the follower means 14, which deposits the conductor 2 in the desired pattern. However, it is easily understood that the deposition of the conductor 2 could be performed by means corresponding to follower means, along said path, when the above mentioned problems of friction between the conductor 2 and the protruding members 10 do not exist. In accordance with one embodiment means are provided to prevent too rapid and too much conductor material 2 to be unreeled from the supply reel or a corresponding means during the conductor lay-out operation. This effect may be achieved for instance by applying a braking force on the reel, which force should be sufficiently weak to allow unreeling of conductor material 2 when the conveyor 13 is in motion but sufficiently strong to prevent for instance surplus conductor material to be unreeled when the conveyor 13 is stopped. In the area of the end 70 of the conductor 2 a follower means (not shown) is provided in accordance with one embodiment, which follows the movements of the follower 14 and which is arranged to ensure that the follower 14 is supplied with the conductor 2 at a suitable angle with respect to the lay-out extension in order to avoid such problems as the conductor 2 sticking to the follower 14. In accordance with an other embodiment this problem is avoided by positioning the conductor supply reel or the equivalent means at such a distance from the conductor lay-out structure and at such a position that angular changes during the deposition of the conductor 2 adjacent the follower will be sufficiently small. However, a conductor supply reel may be disposed linearly above the conductor lay-out structure in FIG. 1 at said distance from said lay-out structure 9.

When the conductor 2 has been deposited in the manner indicated for instance in FIG. 3, parts of the heater 1 in accordance with one embodiment may be inter-connected to produce said essentially contiguous heater 1. The interconnection may be effected in the conductor lay-out structure 9 by for instance gluing, welding, sewing or taping. To facilitate e.g. gluing a support is provided in accordance with one embodiment at and preferably below the deposited conductor 2 in FIG. 3, against which the interconnection may then be performed. In accordance with one preferred embodiment the support in the shape of plates 22 is inserted between the protruding members 10 in the conductor lay-out structure 9 shown in FIG. 3 illustrated schematically in FIG. 12 with respect to another structure). In accordance with one embodiment the protruding members 10 are then formed with bevelled faces 22 to facilitate insertion of the support and to permit interconnection at the desired points of interconnection in the conductor 2. At least in the area of interconnection of the various parts of the conductor 2 the support may be provided with a surface layer preventing the conductor 2 from adhering to the support. In accordance with one embodiment the support is provided with tape which is attached to the conductor 2 by moving the support towards the conductor 2 into engagement therewith at one of its sides, for instance its lower face, while at the same time in accordance with one embodiment a back-up means being displaced towards and into engagement with the opposite side of the conductor 2, for instance its upper face. In accordance with one embodiment also the back-up is provided with a tape, in which case the conductor 2 will be taped from both sides. As is easily understood the support or the back-up may also be made use of to facilitate interconnection by means of e.g. welding or sewing, and that the support may for instance be part of the protruding members 10. In the latter case the support may be for instance the bevelled face 22, which in this case is located slightly spaced from or at the deposited conductor 2. The connecting material, such as tape, glue or the material making part of the seam bond, could also, in accordance with one embodiment, at least partly comprise areas that is affectable by magnets, such as iron powder, which may be attached to a magnet for reasons to be explained further on. In accordance with one embodiment according to which gluing is used as the interconnection method, a support, such as the plates 22, could at least partly comprise areas of material that is affectable by magnets, such as iron powder, which material adheres to the glue used to interconnect parts of the connector 2. As a result of the interconnection an essentially contiguous heater 1 is produced, which may be transferred from the conductor lay-out structure 9 while essentially retaining the lay-out pattern imparted to the conductor.

After the interconnection, the holding devices 16, 18 incorporated in the conductor lay-out structure 9 are moved to the release position, whereupon the heater 1 is transferred from the structure 9. A new conductor 2 may then be deposited in the conductor lay-out structure 9 in the manner indicated above, after said support, for instance in the form of plates 22, as the case may be and as the need arises having been removed from the conductor lay-out structure 9.

Figure 5:
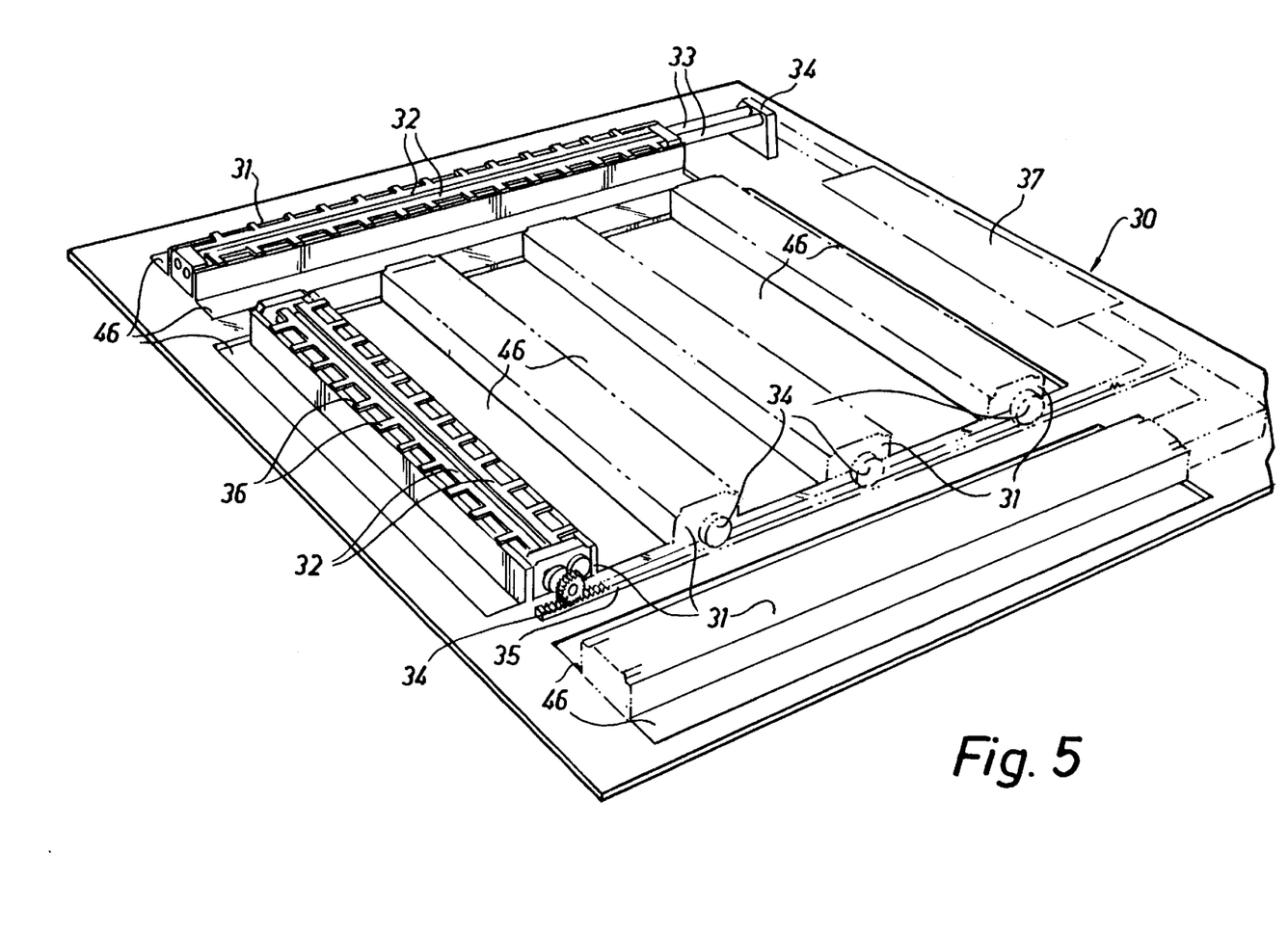
FIG. 5 illustrates schematically one example of an inventive pick-up structure.
Figure 6:
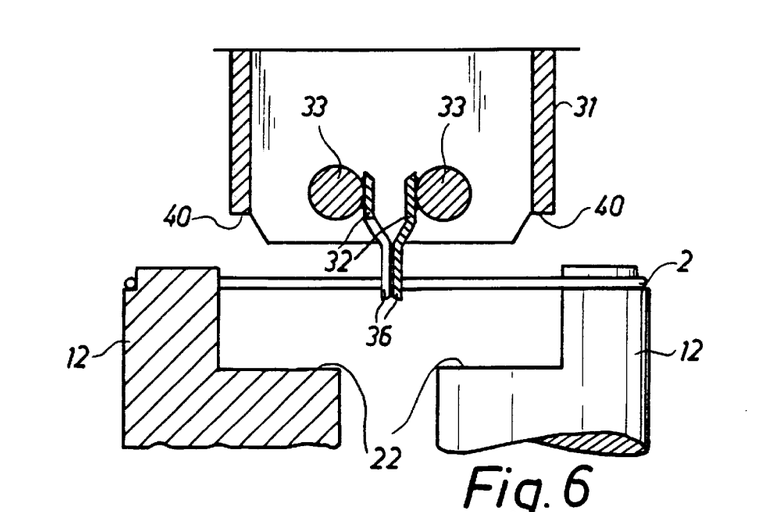
FIG. 6 illustrates schematically in a broken sectional lateral view the manner in which a part of the pickup structure in accordance with one embodiment is lowered on top of a conductor deposited by a conductor lay-out structure.

In accordance with another embodiment a pick-up structure is used, for instance configured as the one illustrated in FIG. 5, generally designated by numeral reference 30. The pick-up structure 30 illustrated in FIG. 5 has six gripping devices 31 four of which are illustrated schematically. Each gripping device 31 is formed with means 32 designed to engage with and essentially fix the conductor that has been deposited in the lay-out structure 9. In accordance with the shown embodiment, the pattern of the conductor 2 deposited in the conductor lay-out structure 9 comprises a plurality of bands of closely juxtaposed bights, each one of which comprises a loop 6 and a open portion 7 facing away from said loop, juxtaposed loops 6 that are turned in the same direction essentially meeting at points of contact 8. In the manner illustrated the means 32 may be in the shape of a plate having teeth 36 thereon and being securely connected to a rotary shaft 33 (see e.g. FIGS. 6 and 7), which upon actuation of e.g. a rack 35 cooperating with a gear 34 may be moved between a position illustrated in FIG. 6, in which the teeth 36 are insertable between adjacent loops 6 of the conductor deposited by the conductor lay-out structure 9, and the position illustrated in FIG. 8, wherein the teeth 36 engage with adjacent loops 6 in the area of the points of contact 8. The engagement fixes the points of contact 8 between the teeth 36 and an edge 40 of the gripping device 31. The area of contact of the edges 40 and/or the teeth 36 with the conductor 2 is coated, in accordance with a preferred embodiment, with a high-friction coating in order to improve the fixation of the conductor 2 to the pick-up structure 30. The pick-up structure 30 likewise comprises a guide 37 to guide the means 32.

Figure 7:
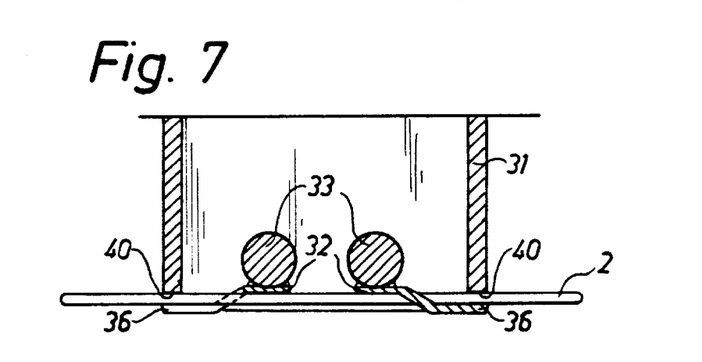
FIG. 7 illustrates schematically in a broken sectional lateral view the manner of engagement of parts of the pick-up structure with a conductor lifted off a conductor lay-out structure.
Figure 8:
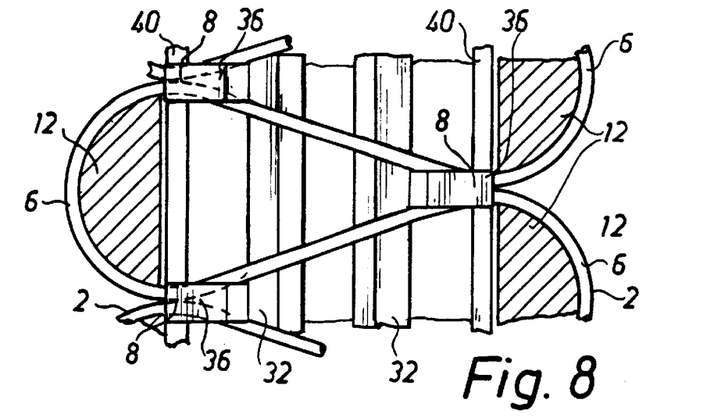
FIG. 8 illustrates schematically in a view from below and in a broken sectional view the manner of engagement of the pick-up structure lowered on top of the conductor lay-out structure with a conductor positioned in the conductor lay-out structure.

When a conductor 2 has been deposited in the conductor lay-out structure 9 it is picked up in accordance with one embodiment for instance by the pick-up structure 30 being turned upside down, from the position illustrated in FIG. 5. The teeth 36 of the pick-up structure 3 are arranged in the position illustrated in FIG. 6 and the pick-up structure 3 is lowered down above the structure 9, the teeth 36 being inserted intermediate adjacent loops 6 of the conductor 2 and in such a manner that the edges 40 will essentially engage with the conductor 2, whereupon the shafts 33 are rotated to bring about the engagement between the teeth 36 and the conductor 2, whereby the lay-out pattern of the conductor 2 is essentially fixed. In accordance with one preferred embodiment the pick-up structure 30 likewise comprises a holder means (not shown) which is arranged to hold fast the ends 3, 4 of the conductor 2. When a holder arrangement 15 in accordance with FIG. 4 is used the holder means could comprise for instance two holders (not shown) arranged to fix the ends 3, 4 of the conductor 2 in the area of points 38 and 39, respectively, as the pick-up structure 30 is lowered down across the conductor lay-out structure 9. The holding devices 16, 18 of the conductor lay-out structure 9 are then moved to their release position, whereupon the pick-up structure 30, and thus the deposited conductor 2, are transferred from the structure 9 as illustrated in the left-hand part of FIG. 10. During the transfer the conductor 2 is held in its fixed position by the pick-up structure 30 as illustrated in FIG. 7, the pick-up structure 30 then forming a second fixture for the heater 1.

Deposition and lay-out of the fresh conductor 2 may be started in the conductor lay-out structure 9.

The connection of the conductor 2 fixed to the pick-up structure 30 may in accordance with one embodiment be achieved for instance by means of gluing, welding, sewing or taping it to the pick-up structure 30. For this purpose the pick-up structure 30 and thus the conductor 2 are arranged in accordance with one embodiment in abutment against a support, for instance by lowering the pick-up structure 30 towards a table in said with respect to FIG. 5 upside-down position, whereupon connection for instance by means of gluing may be effected to said support. For this purpose the pick-up structure 30 is formed with recesses 46 through which e.g. gluing means may be inserted. Also this support may be provided with the above-mentioned superficial layer to prevent the conductor 2 from being adhering to the support. It is easily understood that also the support with tape thereon and/or the back-up means with tape thereon may be used for tape-attachment of the conductor 2 arranged in the pick-up structure 3. The interconnection material, such as tape, glue or material comprised in the seam bond, may in this case at least partly comprise areas of a material that is affectable by magnets, such as iron powder, for reasons to be explained further on.

Figure 9:
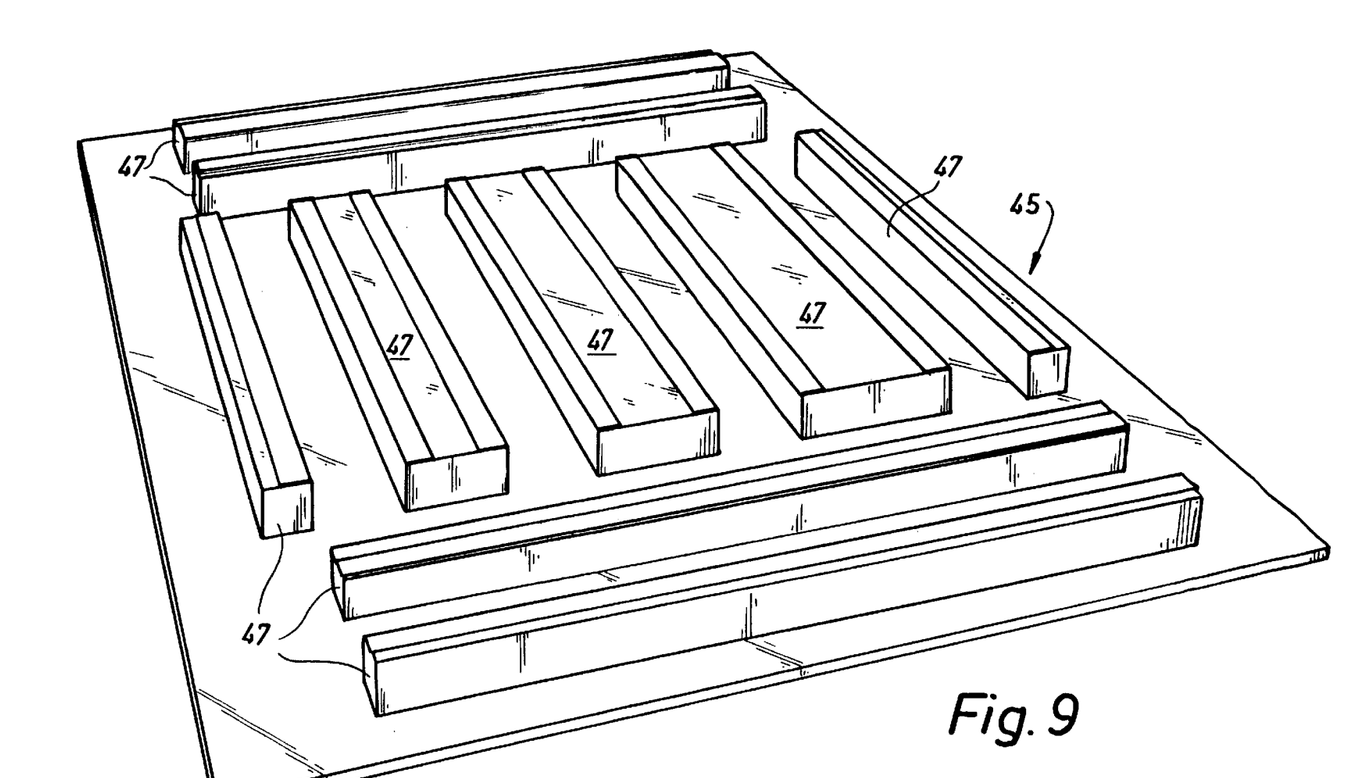
FIG. 9 illustrates schematically a fixation structure in accordance with one embodiment of the invention.
Figure 10:
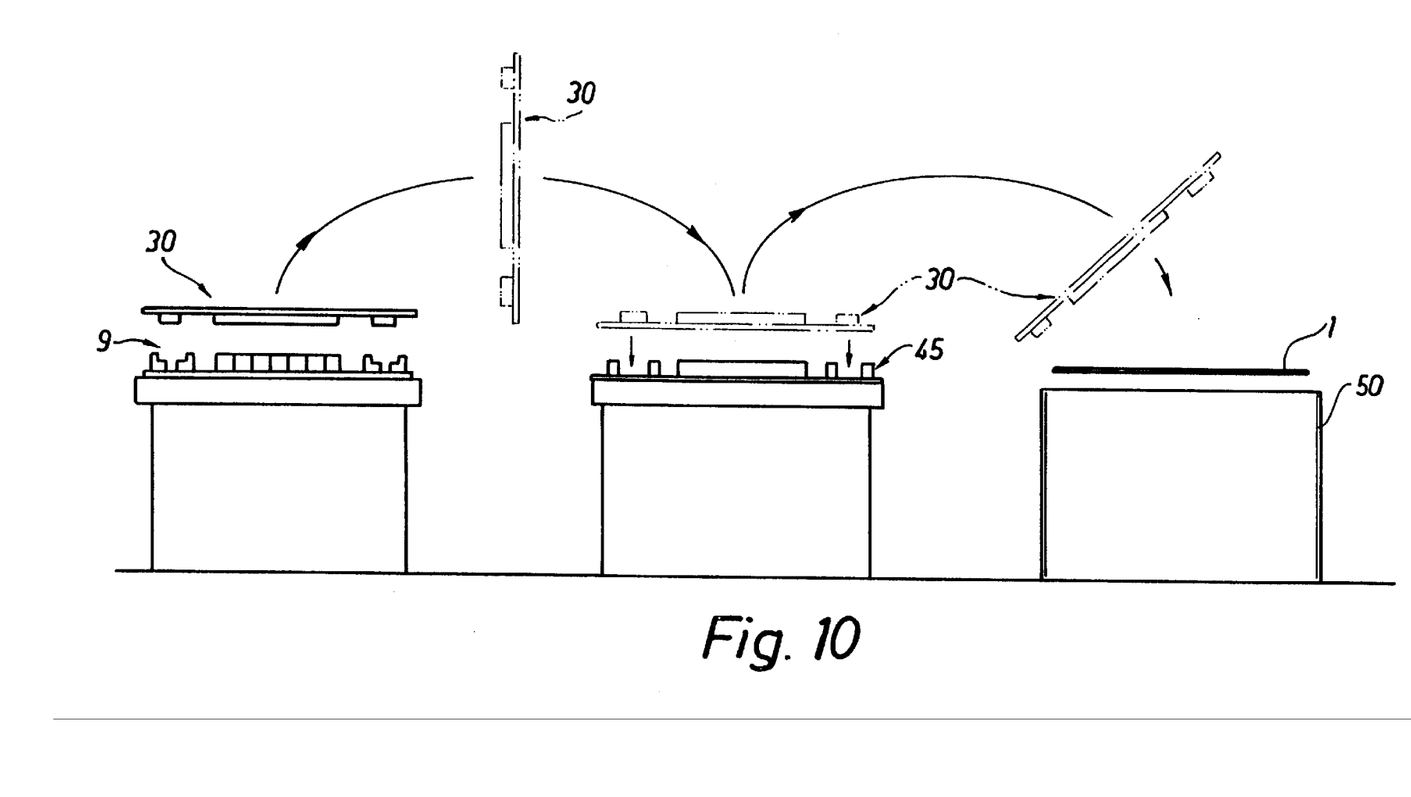
FIG. 10 illustrates schematically the manner in which the pick-up structure in accordance with one embodiment of the invention transfers the deposited conductor from a conductor lay-out structure to a fixation structure and further to a transportation package.
Figure 11:
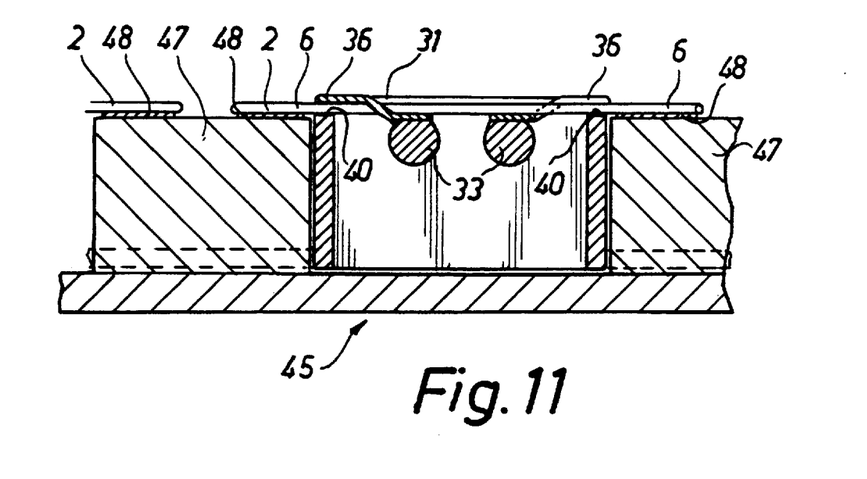
FIG. 11 illustrates schematically in a broken sectional lateral view a part of a pick-up structure including a conductor disposed in a fixation structure.

In accordance with another embodiment interconnection is achieved in an interconnection structure for instance of the type illustrated in FIG. 9 and generally designated by reference numeral 45. The interconnection structure 45 is formed with members 47 matching e.g. recesses 46 in the pick-up structure 30, allowing each gripping device 31 to be disposed between members 47. FIG. 10 illustrates the turning of the pick-up structure 30 in accordance with this embodiment upside-down with respect to the position wherein it picks up the conductor 2 in the conductor lay-out structure 9 and is then again lowered on top of the interconnection structure 45, ensuring that the members 47 pass through the recesses 46. In this case the members 47 support the parts of the conductor 2 to be interconnected, in order to facilitate the interconnection operation. This situation also appears from FIG. 11, illustrating a part of the gripping device 31 of the pick-up structure 30 positioned in the interconnection structure 45, with the conductor 2 in the area of the loops 60 resting against a support in the form of the members 47. In this case the pick-up structure 30 forms part of the interconnection structure 45 and the interconnection structure 45 forms a third fixture for the heating device 1. By means of e.g. gluing or welding the parts of the conductor 2 in the area of the support are interconnected in order to produce an essentially contiguous heater 1. At least in the area of interconnection of the various parts of the connector 2 the support may be provided with a superficial layer 48 preventing the conductor 2 from being connected to the support. In accordance with one embodiment the support is provided with tape which is attached to the conductor 2, whereupon in accordance with one embodiment the conductor 2 is also taped from the opposite side, for instance the upper side as seen in FIG. 11. The interconnection material, such as tape, glue or the material forming part of the seam bond, may also in accordance with one embodiment at least partly comprise areas including material that may be affected by magnets, such as iron powder, for reasons to be explained later on. In accordance with one embodiment wherein gluing is used as the interconnection method, a support may for instance at least partly include areas comprising material that is affectable by magnets, such as iron powder, which material sticks to the glue used to interconnect parts of the conductor 2. In accordance with one modification of this embodiment the surface layer 48 is capable of retaining said material by magnetic force preparatory to the interconnection step. The gluing operation secures the material to the glue string and this material may then be separated from the surface layer 48 when the conductor 2 is moved from the interconnection structure 45. During the interconnection an essentially contiguous heater 1 is produced, which may be transferred from the interconnection structure 9 and the pick-up structure 30 while essentially retaining the pattern of lay-out of the conductor.

Following the interconnection, the pick-up structure 30 is moved, as the case may be, from the interconnection structure 45 in accordance with FIG. 10 or from the support/back-up members, whereupon the pick-up structure is again, when necessary, turned upside down and disposed above a transportation package 50, which may be e.g. a box, whereupon the shafts 33 and the holding means are actuated to release the heater 1 from the pick-up structure 30, placing it in the transporation package 50. In accordance with a preferred embodiment the transporation package 15 is formed with several protrusions (not shown) having a configuration matching at least some of the loops 8 of the heater 1, the heater 1 being separated from the pick-up structure 30 in such a manner that said loops 8 are placed about the protrusions, ensuring that the heaters 1 transported inside the transporation package 50 have an essentially uniform orientation.

Unpacking of the heaters positioned in the transportation package 50 may for instance be accomplished by lowering a frame (not shown) with projections having a configuration matching the loops 6 of the heater 1, down into an opened transporation package 50 from above in such a manner that the projections are inserted into the loops 6, whereupon the transporation package 50 and the frame are for instance turned upside down to ensure that the heaters 1 engage with and are supported by the frame, whereupon the package of transporation is separated from the frame and the heaters 1 supported thereby.

Figure 12:
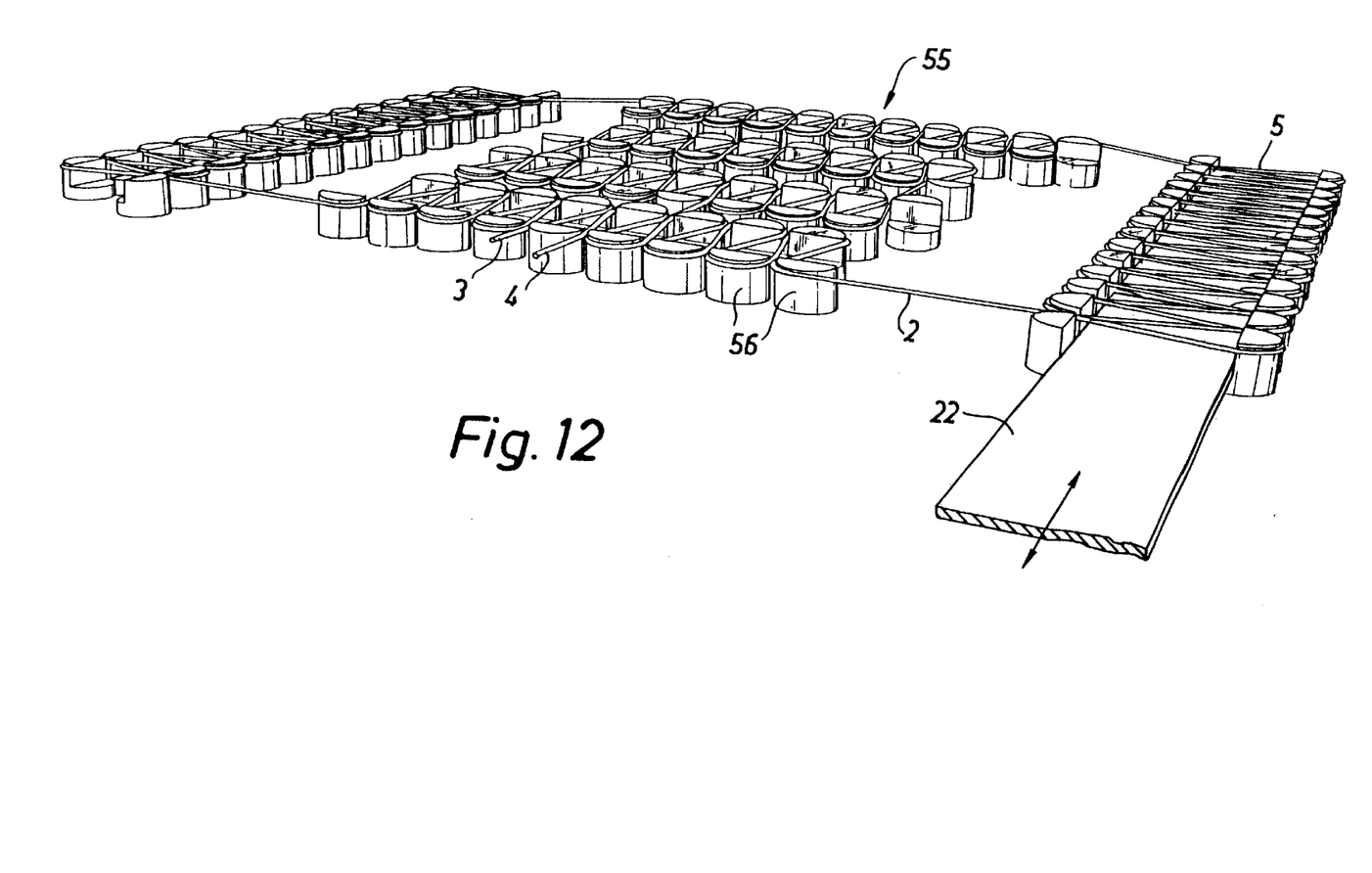
FIG. 12 illustrates schematically a fixation structure in accordance with an alternative embodiment.

In accordance with another embodiment a heater 1, consisting of a non-connected conductor 2 disposed in the pick-up structure 30, is transferred to an interconnection structure which may for instance be configured in the manner illustrated in FIG. 12 and is designated generally by 55. This interconnection structure 55 comprises a plurality of protruding members 56 about which the conductor 2 is disposed for instance by means of the pick-up structure 30, for instance by the pick-up structure 30 being lowered down across the interconnection structure 55 in such a manner that the loops 6 of the conductor 2 are placed about the protruding members 56 and the conductor 2 is fixed to the interconnection structure 55, whereupon the movable parts of the pick-up structure 30 are actuated to disengage the pick-up structure 30 from the conductor 2, the pick-up structure 30 without the conductor 2 then being moved away from the interconnection structure 55. The protruding members 56 of the interconnection structure 55 are disposed in essentially the same pattern as the protruding members 10 of the conductor lay-out structure 9, and in accordance with the shown preferred embodiment they have a configuration identical to that of the upper part 12 of these protruding members 10. The interconnection structure 55 also comprises a holder means (not shown) arranged to fix the ends 3 and 4 of the conductor 2. The interconnection structure 55 thus forms a third fixture for the heater 1. The interconnection is achieved also in accordance with this embodiment in the manner described above with respect to the interconnection in the case of the conductor lay-out structure 9.

In accordance with one embodiment (not shown) a pick-up structure is arranged to transfer also part of the conductor lay-out structure 9 together with a non-connected conductor 2 from the structure 9. For instance, the protruding members 10 may be transferred, or else the upper part 12 thereof may be transferred from the conductor lay-out structure 9 to an interconnection structure (not shown), said interconnection structure then being configured in the manner illustrated in FIG. 12 with respect to the interconnection structure 55. After having been transferred from the lay-out structure 9, the lay-out structure 9 is re-established before the conductor deposition is again started.

After interconnection of parts of the conductor 2 the essentially contiguous heater 1 in accordance with the teachings above may be positioned for instance in a transportion package 50 to be further transported to a cushion or mattress manufacturer or may be transported directly to the premises where the cushions or mattresses are produced.

In accordance with the above-mentioned preferred embodiment the interconnection material comprises at least partly areas of a magnet-affectable material, such as iron powder. This material may be made use of in order to, by means of one or several magnets in a mould, fix the essentially assembled heater 1 in the mould during the foam moulding of the cushion or mattress. The magnet-affectable material may also, in accordance with one embodiment, be made use of to transport the unpacked heaters secured to said frame, to the mold. In accordance with this embodiment use is made for instance of the preferably flexible plate including magnets which by plate means of magnetic force, is connected to an upper or outer heater 1 secured to the frame protrusions and which picks up said heater from the frame, whereupon the plate and the heater 1 are transferred to the mould to position the heater 1 between the plate and the mould, whereupon the plate is pressed against and adopt the configuration of the mould, whereby the mold is interconnected with the heater 1 by magnetic force, retaining the latter inside the mould when the plate is removed from the mould. The force retaining the heater to the mold may be achieved for instance as a result of the magnetic force of the mold on the heater 1 being stronger than the magnetic force of the plate on the heater 1.

In accordance with a preferred embodiment the heater is formed with at least one sensor (not shown), such as a thermistor, which may be connected for instance to a means (not shown) to control the current supply to the heater 1 and/or to a safety means (not shown) which is triggered in response to a predetermined preset temperature of the sensor, whereupon the current supply to the heater 1 is interrupted. In accordance with the preferred embodiment the sensor is arranged at the heater 1 prior to the interconnection of the parts of the conductor 2, whereby the sensor is connected to the heater 1 at the same time and preferably in the same manner as the interconnection of the various parts of the conductor 2.

In accordance with another preferred embodiment the heater 1 comprises contact means (not shown) at its ends 3,4 for interconnection of the heater to said source of current.

It is easily understood that the feature of arranging a plurality of protruding members 10 incorporated in the lay-out structure 9 in a pattern matching the shape of the heater 1, which is achieved in the prepatory step 1 of FIG. 2, for instance by changing the position of the protruding members 10, by altering the path of the conveyor 13 along said protruding members 10, or by changing one or several inserts to which a plurality of protruding members 10 are attached, preferably is carried out as the production is reset from the manufacture of heaters 1 having a first lay-out pattern, to the manufacture of heaters 1 having a second lay-out pattern. The measures of the prepatory step 1 thus need not always be carried out before the deposition step 2 in FIG. 2 is initiated. In order to facilitate said reset, the device for causing the conveyor 13 and/or the holder arrangement 15 to move, is arranged in accordance with a preferred embodiment, in a separate part of the conductor lay-out structure 9, the protruding members 10 being arranged at one or several exchangable parts like the above mentioned inserts.

It is also understood that it is possible to deviate somewhat from the described embodiments. For instance, the conductor 2 may be laid-out along said path in a lay-out structure, one end of the conductor 2 being securely attached to a follower 2, and the opposite end of the conductor 2 preferably being connected to a supply reel or the like for essentially continuous supply of conductor 2 to be deposited by the lay-out structure. The conductor 2 need not be supplied to the lay-out structure essentially continuously as is the case when for instance a reel is used. Instead, it is possible for instance in advance to cut off desired lengths of conductor material 2, whereupon a cut length of conductor is deposited or drawn in the desired lay-out pattern by the conveyor.

The pattern of the path of the conductor 2 around the protruding members in the lay-out structure may also vary within wide limits. In accordance with the above embodiments the conductor 2 has been deposited in the form of one or several bands 5 of closely juxtaposed bights, each bight consisting of a loop 6 and an open portion facing away therefrom, juxtaposed loops that are turned in the same direction being arranged in such a manner that they essentially meet at points of contact 8. However, several alternative lay-out patterns are possible and it is not necessary, although preferable, to arrange the conductor 2 in the form of bights. It is easily understood that the conductor could for instance be deposited in a zig-zag pattern, in which case protruding members having smaller radii than in accordance with the above mentioned embodiments may be used.

It is also understood that the appearance and the function of the pick-up structure and the interconnection structure may be varied within wide limits and still produce essentially the same technical effect. All such modifications and varieties that are comprised by the basic inventive idea should, however, fall within the scope of the appended claims.

What is claimed is:

1. A method of manufacturing an electric heater used for heating foam-molded cushions, wherein said heater is formed of an electric conductor, which said electric conductor is one of an insulated and non-insulated wire, comprising the steps of:

arranging a plurality of protruding members having first and second parts so as to form part of a conductor layout structure in a pattern adapted to a desired configuration of the heater, said protruding member second part being rotatable about the vertical axis of said protruding member;

arranging a continuous flexible conveyor around said protruding members in a pattern of a path which corresponds to the same desired configuration of the heater, said continuous flexible conveyor provided with a follower attached thereto, said follower for facilitating the deposition of said electric conductor around said protruding members; and arranging said continuous flexible conveyor in said path so that said follower deposits said conductor in said pattern, wherein said protruding members form a part of a first fixture for the heater.

2. A system for the manufacture of an electric heater intended for heating cushions, said heater comprising an electric conductor comprising one of an insulated and non-insulated wire, characterized in that said system comprises a conductor layout structure comprising a plurality of protruding members having first and second parts arranged in a pattern corresponding to the desired configuration of said heater, said protruding member second part being rotatable about the vertical axis of said protruding member, a continuous flexible conveyor arranged about said protruding members in said desired configuration, said continuous flexible conveyor having a follower attached thereto, said follower being arranged to deposit said conductor in said pattern.

3. A method of manufacturing an electric heater used for heating foam-molded cushions, wherein said heater is formed of an electric conductor, which said electrical conductor is one of an insulated and non-insulated metal wire, comprising the steps of:

arranging a plurality of protruding members having first and second parts so as to form part of a conductor layout structure in a pattern adapted to a desired configuration of the heater, said protruding member first part being stationary and said protruding member second part being rotatable about the vertical axis of said protruding member;

arranging a continuous flexible conveyor around said protruding members second parts in a pattern of a path which corresponds to the same desired configuration of the heater, said continuous flexible conveyor provided with a follower attached thereto, said follower for facilitating the deposition of said electric conductor around said protruding members first parts; and moving said continuous flexible conveyor in said path so that said follower deposits said conductor in said pattern, wherein said protruding members form a part of a first fixture for the heater.

4. A system for the manufacture of an electric heater intended for heating cushions, said heater comprising an electric conductor comprising one of an insulated and non-insulated wire, characterized in that said system comprises a conductor layout structure comprising a plurality of protruding members having first and second parts arranged in a pattern corresponding to the desired configuration of said heater, said protruding member first part being stationary and said protruding member second part being rotatable about the vertical axis of said protruding member, a continuous flexible conveyor arranged about said protruding members second partss in said desired configuration, said continuous flexible conveyor having a follower attached thereto, said follower being arranged to deposit said conductor in said pattern.

* * * * *